(12) United States Patent
Heinrichs-Bartscher

(10) Patent No.: US 7,212,907 B2
(45) Date of Patent: May 1, 2007

(54) SYSTEM FOR INFLUENCING THE SPEED OF A MOTOR VEHICLE

(75) Inventor: Sascha Heinrichs-Bartscher, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/132,790

(22) Filed: May 19, 2005

(65) Prior Publication Data

US 2005/0251313 A1 Nov. 10, 2005

(51) Int. Cl.
*B60T 7/12* (2006.01)

(52) U.S. Cl. .............................. 701/96; 701/93; 701/97

(58) Field of Classification Search ................... 701/93, 701/96, 97, 300, 301; 180/172
See application file for complete search history.

(56) References Cited

U.S. PATENT DOCUMENTS

| | | | |
|---|---|---|---|
| 4,308,536 A | 12/1981 | Sims, Jr. et al. | |
| 4,632,543 A | 12/1986 | Endo | |
| 4,829,434 A | 5/1989 | Karmel et al. | |
| 5,388,048 A | 2/1995 | Yavnayi et al. | |
| 5,483,242 A | 1/1996 | Grein et al. | |
| 5,510,990 A | 4/1996 | Hibino et al. | |
| 5,529,139 A | 6/1996 | Kurahashi et al. | |

(Continued)

FOREIGN PATENT DOCUMENTS

DE 4446859 A1 6/1995

(Continued)

OTHER PUBLICATIONS

Grimes, et al., "Automotive Radar: A Brief Review", Proceedings of the IEEE, vol. 62, No. 6, Jun. 1974, pp. 304-322.

(Continued)

*Primary Examiner*—Thomas Black
*Assistant Examiner*—Brian J. Broadhead
(74) *Attorney, Agent, or Firm*—MacMillan, Sobanski & Todd, LLC

(57) ABSTRACT

System for the evaluation of the driving environment of a vehicle and for influencing the speed of the vehicle in its own lane, with an electronic control unit that is connected to a signal generator generating a signal characteristic of the desired speed of the vehicle, to a signal generator generating a signal characteristic of the turning rate of the vehicle about its vertical axis, to a signal generator that generates for objects located in the space in front of the vehicle and in the direction of travel of the vehicle a characteristic signal with respect to their distance and orientation relative to the vehicle, said signal being the speed relative to the speed of the driver's vehicle and/or the distance relative to the driver's vehicle and/or the angular displacement or the lateral deviation relative to the longitudinal axis of the driver's vehicle, and to a signal generator that generates a signal characteristic of the speed of at least one wheel of the vehicle, and that is connected to at least one control device having an influence on the driving behaviour of the vehicle, in order to feed to said control device output signals that are derived from the driving behaviour of the vehicle located in front of the driver's vehicle, in which in order to define the mid line of the driver's lane in the space detected in front of the driver's vehicle the radius of curvature R of the path curve of the centre of gravity of the driver's vehicle is modified in the electronic control unit on the basis of the change of angular bearing of the objects driving in front, and/or on the absolute position of the objects driving in front relative to an instantaneously predicted lane.

5 Claims, 10 Drawing Sheets

U.S. PATENT DOCUMENTS

| | | |
|---|---|---|
| 5,612,699 A | 3/1997 | Yamada |
| 5,633,642 A | 5/1997 | Höss et al. |
| 5,638,790 A | 6/1997 | Minowa et al. |
| 5,648,905 A | 7/1997 | Izumi et al. |
| 5,710,565 A | 1/1998 | Shirai et al. |
| 5,724,944 A | 3/1998 | Minowa et al. |
| 5,913,917 A | 6/1999 | Murphy |
| 5,926,126 A | 7/1999 | Engelman ................ 342/70 |
| 5,947,087 A | 9/1999 | Minowa et al. |
| 5,999,847 A | 12/1999 | Elstrom |
| 5,999,874 A | 12/1999 | Winner et al. |
| 6,018,308 A | 1/2000 | Shirai |
| 6,032,646 A | 3/2000 | Minowa et al. |
| 6,040,795 A | 3/2000 | Watanabe |
| 6,076,034 A | 6/2000 | Satoh et al. |
| 6,107,956 A | 8/2000 | Russell et al. |
| 6,114,973 A | 9/2000 | Winner et al. |
| 6,114,985 A | 9/2000 | Russell et al. |
| 6,116,369 A | 9/2000 | King et al. |
| 6,147,637 A | 11/2000 | Morikawa et al. |
| 6,188,950 B1 | 2/2001 | Tsutsumi et al. |
| 6,206,123 B1 | 3/2001 | Kim |
| 6,226,571 B1 | 5/2001 | Kai |
| 6,233,516 B1 | 5/2001 | Egawa |
| 6,260,539 B1 | 7/2001 | Minowa et al. |
| 6,278,362 B1 | 8/2001 | Yoshikawa et al. |
| 6,294,986 B1 | 9/2001 | Landsiedel ................ 340/435 |
| 6,300,896 B1 | 10/2001 | Kull et al. |
| 6,304,811 B1 | 10/2001 | Prestl |
| 6,311,120 B1 | 10/2001 | Asada |
| 6,401,024 B1 | 6/2002 | Tange et al. |
| 6,401,694 B2 | 6/2002 | Minowa et al. |
| 6,427,533 B1 | 8/2002 | Yoshida |
| 6,466,863 B2 | 10/2002 | Shirai et al. ................ 701/200 |
| 6,468,972 B1 | 10/2002 | Pruche et al. |
| 6,493,625 B2 | 12/2002 | Andreas et al. |
| 6,526,346 B2 | 2/2003 | Ishizu et al. |
| 6,543,422 B2 | 4/2003 | Minowa et al. |
| 6,573,859 B2 | 6/2003 | Tokoro |
| 6,653,935 B1 | 11/2003 | Winner et al. |
| 6,675,094 B2 | 1/2004 | Russell et al. |
| 6,721,645 B2 | 4/2004 | Lueder et al. |
| 6,763,904 B2 | 7/2004 | Winner et al. ............. 180/167 |
| 6,769,504 B2 | 8/2004 | Kobayashi et al. |
| 6,775,605 B2 | 8/2004 | Rao et al. |
| 6,784,828 B2 | 8/2004 | Delcheccolo et al. |
| 6,816,084 B2 | 11/2004 | Stein |
| 6,842,687 B2 | 1/2005 | Winner et al. |
| 6,856,887 B2 | 2/2005 | Akabori et al. |
| 6,889,161 B2 | 5/2005 | Winner et al. |
| 2002/0003489 A1 | 1/2002 | Samukawa et al. |
| 2002/0032514 A1 | 3/2002 | Kuroda et al. |
| 2002/0044080 A1 | 4/2002 | Shirai et al. |
| 2002/0049539 A1 | 4/2002 | Russell et al. |
| 2002/0121398 A1 | 9/2002 | Kikuchi et al. |
| 2002/0128751 A1 | 9/2002 | Engstrom et al. |
| 2003/0154011 A1 | 8/2003 | Rao et al. |
| 2003/0225519 A1* | 12/2003 | Miyahara ................ 701/301 |
| 2004/0064241 A1* | 4/2004 | Sekiguchi ................ 701/96 |
| 2004/0117090 A1* | 6/2004 | Samukawa et al. .......... 701/45 |
| 2004/0153233 A1* | 8/2004 | Minowa et al. ............. 701/96 |
| 2005/0010351 A1* | 1/2005 | Wagner et al. ............. 701/96 |

FOREIGN PATENT DOCUMENTS

| | | |
|---|---|---|
| DE | 198 35 518 | 4/1999 |
| DE | 19757063 A1 | 6/1999 |
| DE | 19901175 A1 | 7/1999 |
| DE | 19821163 A1 | 11/1999 |
| DE | 19828160 A1 | 12/1999 |
| DE | 19637245 C2 | 2/2000 |
| DE | 19637053 C2 | 3/2000 |
| DE | 19954536 A1 | 5/2001 |
| DE | 10006403 A1 | 8/2001 |
| DE | 10105240 A1 | 8/2001 |
| DE | 10007501 A1 | 9/2001 |
| DE | 100 18 556 | 10/2001 |
| DE | 101 22 860 | 11/2001 |
| EP | 0 612 641 | 8/1994 |
| EP | 0 657 857 | 6/1995 |
| EP | 0726473 B1 | 8/2001 |
| EP | 0928714 B1 | 5/2004 |
| EP | 0897824 B1 | 9/2004 |
| JP | 2000298800 A | 10/2000 |
| WO | WO 95/14939 A1 | 6/1995 |
| WO | WO 01/79882 A1 | 10/2001 |
| WO | WO 02/084330 A1 | 10/2002 |

OTHER PUBLICATIONS

English translation of DE 19821163 Abstract.
English translation of DE 19828160 Abstract.
English translation of JP 2000298800 Abstract.

* cited by examiner

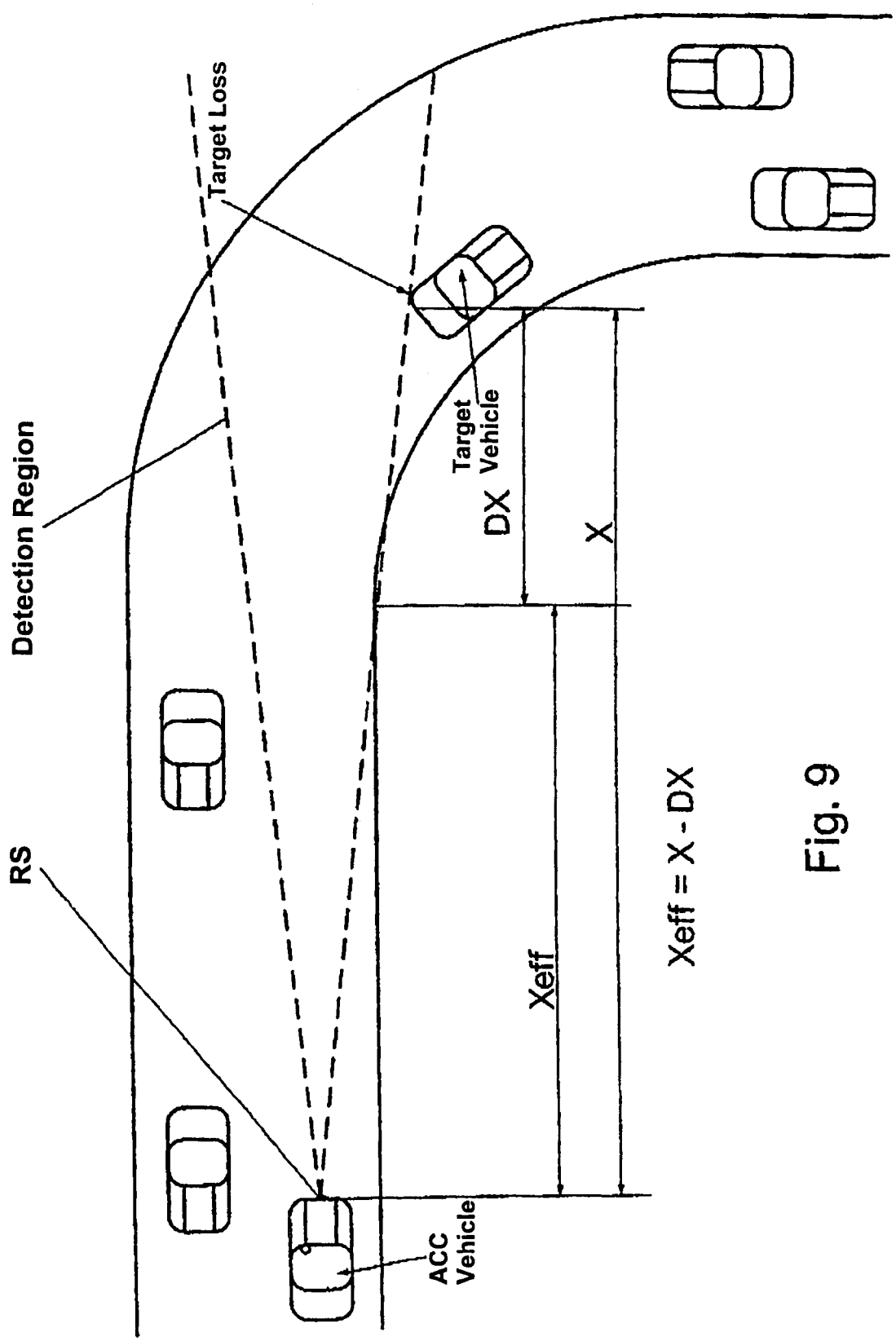

SYSTEM FOR INFLUENCING THE SPEED OF A MOTOR VEHICLE

CROSS REFERENCE TO RELATED APPLICATION

This application claims priority to application No. PCT/EP03/013036 filed Nov. 20, 2003, the disclosures of which are incorporated herein by reference, which claims priority to German Application No. 102 54 403.4 filed Nov. 21, 2002, the disclosures of which are incorporated herein by reference.

BACKGROUND OF THE INVENTION

The present invention relates to a system for influencing the speed of a motor vehicle. Such control systems are increasingly used under the description ACC (Autonomous/Adaptive Cruise Control) in motor vehicles, in particular top-of-the-range and upper-mid-range class models.

Devices are known that regulate the driving speed of a motor vehicle, in which the driver can preset a desired speed and the driving speed of the motor vehicle can be brought to and maintained at this target speed by means of a speed regulator as long as this device is activated. However, with this system there is no monitoring of the driving speed of a vehicle in front. The driver therefore has to act when his vehicle approaches the vehicle in front. Likewise, the driver can however also correspondingly increase the speed of his vehicle if the speed of the vehicle in front increases.

A device that takes over from the driver the task of monitoring the distance to the vehicle in front and that matches the speed of the driver's vehicle to the speed of a vehicle in front is described for example in EP-A-0 612 641.

In order to broaden successfully such ACC systems, a safer and more reliable operation of this system is necessary, which also results in better driving comfort and thus in an improved acceptability when driving. In particular the invention is concerned with the problems of recognizing whether a curve exists in front of the driver's vehicle before the vehicle has reached or begun to travel on this curve.

BRIEF SUMMARY OF THE INVENTION

The function of an ACC system of the type according to the invention is based on the fact that a sensor, generally a radar sensor, with a relatively narrow detection region and as a rule rigidly fixed facing forwards, is arranged on the front part of the driver's vehicle. This sensor serves to detect objects present in the detection region and to notify an electronic control unit accordingly (including distance and lateral deviation or angular position relative to the mid axis of the sensor or motor vehicle, as well as possibly the size of the object).

The invention is in this connection based on the knowledge that a more intensive evaluation of the driving environment of the driver's vehicle is necessary. The results of this evaluation of the driving environment are then used to influence the speed of the driver's vehicle.

In order to define the mid line of the driver's lane in the space detected in front of the vehicle, the present system modifies the radius of curvature R of the path curve of the centre of gravity of the driver's vehicle on the basis of the change in angular bearing of the objects in front and the absolute position of the objects in front compared to the instantaneously predicted lane in the electronic control unit.

In other words, the relative speeds and change of the latter over time of vehicles in front are evaluated. In this way the reliability and the overall efficiency of the system according to the invention is considerably improved.

From the data provided by the sensor as well as from some other data obtained at another point in the driver's vehicle (speed, turning rate or yawing rate about the vertical axis of the driver's vehicle, transverse acceleration of the driver's vehicle, etc.) the lane or the traffic corridor of the driver's vehicle is then first of all determined in the electronic control unit. Based on this, as a rule the nearest motor vehicle in the driver's traffic corridor is then determined according to specific criteria as the target vehicle in front in order to regulate the distance to this vehicle by engaging the speed control, the gear change and the braking system. In this way it is possible for the driver's vehicle to follow a vehicle in front at a safe distance (possibly depending on the speed and other factors), in which connection the determination and maintenance of the safe distance is effected by interventions in the speed control system and in the braking system of the driver's vehicle independently of the driver. As a rule the driver only has to set a desired speed of his vehicle and/or a desired distance of his vehicle from a target vehicle.

In other words the invention provides a system for evaluating the driving environment of a vehicle and for influencing the speed of the vehicle. This system has an electronic control unit that is connected to a signal generator that generates a signal characteristic of the desired speed/desired safe distance of the vehicle. In addition the instantaneous (actual) speed of the driver's vehicle is fed to the electronic control unit.

Furthermore the electronic control unit is connected to a signal generator that generates a signal characteristic of the turning rate of the vehicle about its vertical axis.

In addition the electronic control unit is connected to a signal generator that generates a signal characteristic of objects located in the space in front of the vehicle in the direction of travel of the vehicle, in terms of their distance and orientation with respect to the said vehicle. In this connection the signal generator may involve a radar sensor, an ultrasound or infrared sensor, but also an image sensor (video camera). The space scanned with the sensor is roughly conical or lobar and, depending on the actual environmental circumstances, has a length of about 100–250 meters and a cone angle of about 12°. A reliable detection/selection can thus be made for objects that are located at a distance of about 170±30 metres from the driver's vehicle and/or that are moving within this region in front of the driver's vehicle.

Finally, the electronic control unit is connected to a signal generator that generates a signal characteristic of the (rotational) speed of at least one wheel of the vehicle. This may for example be the rotational speed transmitter of the anti-lock braking system (ABS). The signals from these signal generators are processed in the electronic control unit by means of one or more computing units. The results thereby obtained are fed as output signals, derived from the movement behaviour of the vehicle in front of the driver's vehicle, from the electronic control unit to at least one control device that influences the movement behaviour of the driver's vehicle.

Since the detection of the objects takes place in a time frame of a few tens of milliseconds (for example 50 milliseconds), the time changes of the positions of the individual objects can be established in the electronic control unit. By taking account of the movement or movements of the driver's vehicle, movements of the objects as well as possibly their relative speed can also be calculated in the electronic control unit. From these results the electronic control unit then specifies whether the object is "stationary", "moving in substantially the same direction as the driver's vehicle" or "moving substantially in the opposite direction to the driver's vehicle".

In other words, from signals emitted by the signal generator, which generates a signal that is characteristic of objects located in the space in front of the vehicle and in the direction of travel of the vehicle as regards their distance and orientation with respect to the vehicle, for objects located in this space at least their speed relative to the speed of the driver's vehicle, their distance relative to the driver's vehicle, as well as the angular displacement or the lateral deviation relative to the longitudinal axis of the driver's vehicle are continuously detected and evaluated in the electronic control unit.

In this connection, the number of monitored objects is limited for practical reasons. Stationary targets, i.e. those whose relative speed in the direction of travel of the driver's vehicle is equal to the speed of the driver's vehicle but with opposite sign, are excluded. Objects close to the driver's vehicle are given preference over objects further from the vehicle.

All objects that are in any case classified by the electronic control unit as target objects on account of the signals detected by the radar sensor are grouped in an object table, in which are also included the respective properties and data of the objects and are input and updated on the basis of the continuous (new) calculations by the electronic control unit.

In particular, in order to reduce the number of possible targets on the carriageway in front of the driver's vehicle, as a rule not all the detection space—bounded by the cone angle of the (radar) sensor—but instead a correspondingly reduced region is evaluated. This measure reduces the number of objects to be taken into account. For the sake of simplicity however—unless otherwise specifically indicated—it will be assumed hereinafter that the actually evaluated region and the detection space in front of the driver's vehicle are the same.

As explained hereinbefore, a stage in the determination of the vehicle to be "followed" by the driver's vehicle is the determination of the driver's own lane. This is defined by its mid line, its width and, as an approximation, by sections of constant radius of curvature. In order to define the mid line in the driver's lane in the space detected in front of the driver's vehicle, the present system modifies the radius of curvature R of the path curve of the centre of gravity of the driver's vehicle on the basis of the change in angular bearing of the objects in front and change in the absolute position of the objects in front compared to the instantaneously predicted lane in the electronic control unit.

In this connection the speed of the driver's vehicle divided by its instantaneous rate of turning, which is defined as initial value for the radius of curvature R (for example where there are no objects in front), is passed by the corresponding signal generator to the electronic control unit. The radius of curvature of the path curve is then modified in the electronic control unit by the lateral speeds depending on objects moving in the space detected in front of the vehicle.

Some further criteria that lead to a change in the curvature and that are taken into account and evaluated by the program operating in the electronic control unit in the updating of the radius of curvature are the following:

the residence time of the objects moving in the space detected by the sensor in front of the device, the speed, in the direction of travel of the driver's vehicle, of the objects moving in the space detected in front of the driver's vehicle, and/or the distance from the driver's vehicle of the objects moving in the space detected in front of the driver's vehicle.

If the driver's vehicle is travelling at low speed the radius of curvature is also reduced, since an enhanced stability (low background noise, or constancy) of the signal reproducing the lateral position of the vehicle is achieved in this way. Preferably for this purpose a (non-linear) reduction factor is included for this purpose in a table.

The extent to which changes in the curve radius are permissible also depends on the curve radius itself. With a very small curve radius a relatively high rate of change is permitted. In particular when leaving a curve it then happens that on a straight stretch following the curve, the correct lane of the vehicle in front that was selected as target vehicle—but also the driver's own lane—is quickly found again.

The system according to the invention specifies a width of the driver's own lane that first of all depends on the vehicle measurements plus a safety factor of about 0.2–0.7 metre on each side. On a straight stretch the driver's lane would accordingly be substantially rectangular in shape, the length of which—considered at any point in time—is somewhat less than the range of the radar sensor. This substantially rectangular lane is simulated as data structure in the electronic control unit. In this connection the width of the lane in the near region (about 0–50 metres) and in the far region (150+ metres) is specified to be smaller than in the middle region (50–150 metres).

In order to maintain the data structure in the electronic control unit as efficiently as possible, in the system according to the invention the width of the driver's lane is specified in the electronic control unit only at those points in the space in front of the driver's vehicle at which objects are also located in the space detected in front of the driver's vehicle.

The system modifies in the electronic control unit the width of the driver's lane depending on the distance of detected objects in the space in front of the driver's vehicle and the orientation of a curve in the electronic control unit, so that at large distances (150+ metres) the width at the outside of the curve decreases, and at middle distances (50–150 metres) the width at the inside of the curve increases. This procedure reduces the selection of unsuitable objects as target vehicles that are "followed" by the driver's vehicle.

In order that small lateral movements of the target vehicle to be followed do not result in these lateral movements being recognised by the electronic control unit as a change in lane of this vehicle, the width of the driver's lane (and thus also the lane of the target vehicle to be followed) is widened in the electronic control unit (ECU) on both sides at the point at which the target vehicle is situated.

Similarly, the driver's lane is also widened in the electronic control unit on both sides at the point at which the said target vehicle is located, depending on the time for which the movement behaviour of the driver's vehicle depends on the movement behaviour of this target vehicle.

In addition to or instead of the above measure for stabilising the movement behaviour of the driver's vehicle, the width of the driver's lane may also be modified in the electronic control unit, depending on the "curveness" of the road on which the driver's vehicle is travelling. In particular, in this case the width is reduced if the road has a lot of curves. For this purpose the instantaneous radius of curvature and possibly also the radius of curvature very slightly beforehand is/are evaluated in the electronic control unit. For a small radius of curvature the width is reduced.

The same also applies to the measure, similarly in accordance with the invention, of modifying, at least by sections, in the electronic control unit, the width of the driver's lane, depending on the speed of the driver's vehicle. If the driver's vehicle is travelling at high speed, the width of the driver's lane is increased in order to prevent the target vehicle already being "lost" on account of slight lateral movements of the driver's vehicle or of the vehicle being followed.

A further criterion in determining the optimal target vehicle in front, on the movement behaviour of which is to be made dependent the movement behaviour of the driver's vehicle, is the determination of the lanes of the road on which the driver's vehicle is moving. In this connection no attempt is made to find boundary markings of the lane, which in any case often do not exist. Instead, the behaviour of the other objects moving in the space detected in front of the driver's vehicle is evaluated in order to obtain feedback on how many lanes the road has, and on which of these lanes the driver's vehicle is moving.

The system according to the invention operates so-called lane lists for three lanes in the direction of movement of the driver's vehicle as well as for three lanes in the opposite direction. In principle, for this purpose the time course of the lateral deviation (i.e. the lateral displacement of the respective object compared to the mid axis of the driver's vehicle and/or the course of the predicted lane) is smoothed in the electronic control unit for each moving object from the object table by means of a low-pass filter with a short time constant and is then integrated.

In order to generate the lane lists from the object table and update them, first of all the driver's lane is defined. For this purpose objects at the side edges of the detected space are weighted with a small weighting factor and objects in the middle region of the detected space are weighted with a higher weighting factor. Similarly, very far objects and very near objects with a large lateral deviation are weighted with a small weighting factor. All objects with a low evaluation value have in common the fact that their exact lateral position can be determined only with difficulty and is also subject to a high degree of uncertainty. For this reason they should have only a low importance in the lane determination.

The driver's lane is determined in the electronic control unit from the objects weighted in this way, taking into account the movements of the driver's vehicle.

On the basis of these results for the individual objects, moving objects are classified in the electronic control unit as objects in the driver's lane if an object further away than a minimum distance stays in the driver's lane for a predetermined period of time that is related to the sum of the stay duration in one or both adjacent lanes that exceeds a threshold value dependent on the distance of the object.

On the basis of the above determination of the objects in the driver's lane, in order to optimise and adapt the function to different boundary conditions and environments the predetermined period of time can be modified in the electronic control unit depending on the speed of the driver's vehicle.

Also, the threshold value can be reduced in the electronic control unit as the distance of the object from the driver's vehicle becomes less.

Finally, moving objects detected in the space in front of the driver's vehicle are classified in the electronic control unit as objects located to the left or right of the driver's lane if an object at the corresponding distance is located left of the left-hand boundary of the driver's lane or right of the right-hand boundary of the driver's lane.

For vehicles coming in the opposite direction a lane allocation is similarly made on the basis of their direction of travel and their respective lateral deviation.

Overall, according to the invention the residence duration of all objects is determined for the existing lanes with respect to the driver's lane and weighted over time, in which connection later appearances of objects in the lane of the driver's vehicle are evaluated higher than earlier appearances, and spatially distant appearances of objects in the lane of the driver's vehicle are given a lower evaluation than spatially closer appearances. In this way it can be reliably determined whether the object is travelling in the driver's lane. When choosing the target object behind which "to drive up to", this reduces the probability of a incorrect choice.

From the existing lanes a maximum of two moving objects are now in each case selected in the electronic control unit and characterised as priority objects if they have been detected as such moving in front of the driver's vehicle for a period of time exceeding a minimum value, in which connection this respective duration of each object is weighted less for objects located very close to the driver's vehicle (ca. 0–ca. 30 m).

The number of candidates from which the target vehicle is selected is thereby already greatly restricted. This maximum number of six objects are those objects that are of particular importance for the movement behaviour of the driver's vehicle. Accordingly, to a first approximation it is sufficient to consider these six objects in order to match the instantaneous movement behaviour of the driver's vehicle with respect to them. In this connection, for each priority object it is established in the electronic control unit how far each priority object changes its lateral position relative to the mid line of the lane of the driver's vehicle. In this way the sum of the mean values of the lateral position changes of the priority objects is determined as alteration value of the lane of the driver's vehicle at the respective distance to the said driver's vehicle.

The electronic control unit now selects from the priority objects that object as target object, on the movement behaviour of which the movement behaviour of the driver's vehicle is to be dependent, which is moving in the lane of the driver's vehicle, has a direction of movement over the ground that coincides substantially with the direction of movement of the driver's vehicle, and has already been detected during a predetermined duration in the space in front of the driver's vehicle.

The program operating in the electronic control unit chooses as target vehicle from the priority objects preferably that object, on the movement behaviour of which the movement behaviour of the driver's vehicle is to be dependent, in which the transverse speed relative to the mid line of the driver's lane does not exceed a threshold value. To this end, for the individual objects their lateral deviation from the target list is preferably differentiated according to time. In this connection the threshold value can be changed depending on the distance of the respective object to the driver's vehicle. These measures ensure that preferably a vehicle that has a relatively smooth movement behaviour is chosen as the target vehicle to be followed. As a result of this the probability that this selected vehicle is "goes missing from the sensor detection" is also slight, which in turn leads to a smoother movement behaviour of the driver's vehicle.

As a further improvement of the certainty of detection, in particular in order to avoid mirror effects of the sensor beam (at the carriageway boundary or at other, possibly moving, objects), a value that reproduces the background noise amplitude of the bearing angle for each of the objects is held by the electronic control unit in the target list for each object and is regularly updated. For all objects the time progression of this value is smoothed in the electronic control unit by means of a low-pass filter. If the smoothed value progression for an object exceeds a distance-dependent threshold value, this object is excluded from the choice of target vehicle.

A further way of improving the stability of the system—i.e. for avoiding incorrect choices—is if the electronic control unit excludes a priority object from the target list from which the choice of target vehicle is made if (i) its distance to the driver's vehicle is less than a distance threshold value,
(ii) the absolute value of the bearing angle with respect to this priority object is greater than an angle threshold value (for example 4°), and
(iii) this priority object was not previously chosen as target vehicle. In this way it is ensured that an—unnecessary—change of the target vehicle or switching backwards and forwards between two (presumably) "equally good" objects is avoided. This has the positive effect that an increase or decrease of the speed of the driver's vehicle associated with the change to a new target vehicle is avoided.

The system according to the invention continuously evaluates for the target vehicle the change in the bearing angle seen from the driver's vehicle as well as the turning rate for the driver's vehicle in order to detect any change in lane of the driver's vehicle. For this purpose it is established whether the change in the bearing angle relative to the target vehicle, on the movement behaviour of which the movement behaviour of the driver's vehicle is to be dependent, exceeds a specified threshold value and is substantially equal to the turning rate of the driver's vehicle with reverse sign.

In order to recognise whether the driver's vehicle is travelling in a curve, in the electronic control unit a quantity related to the curvature of the lane of the driver's vehicle is fed as input signal in parallel to a plurality of low-pass filters with different time constants (less than preferably $1^{st}$ order). The output signals of the low-pass filters and the input signal are compared with one another. If the output signals (amplitudes) have a respective minimum distance to one another and the output signal of a respective low-pass filter is less than the output signal of a low-pass filter with a smaller time constant and is greater than the output signal of a low-pass filter with a larger time constant, or the output signal of a respective low-pass filter is greater than the output signal of a low-pass filter with a smaller time constant and is less than the output signal of a low-pass filter with a larger time constant, then when the driver's vehicle is moving on the road this is recognised as a transition from a curve of one orientation to a curve of the opposite orientation. If the electronic control unit has established that the driver's vehicle is executing a curve transition, for example is in an S-curve, the length of the evaluated lane is reduced since in this situation different objects can very often change their lateral deviation to a very great extent. With a reduced evaluation length, in particular objects moving at a relatively large distance in front of the driver's vehicle are excluded from consideration. Since the probability that an object driving at a relatively large distance in front of the driver's vehicle will appear erroneously in the driver's lane is relatively high in such a situation, the error rate is lowered by reducing the evaluation length.

An essential aspect in the environment recognition is recognizing the type of road. The recognition of the type of road is of advantage for an optimal matching when selecting the target vehicle and when regulating the speed of the driver's vehicle. This is based on the knowledge that different types of road require a significantly different matching of individual system parameters (length and width of the lane or lanes to be evaluated, acceleration thresholds, etc.) in order to operate the system optimally, in other words so that it corresponds as exactly as possible to the driver's expectations.

The system according to the invention evaluates the speed of the driver's vehicle, the number of recognised lanes having the same direction of travel as that of the driver's vehicle, the curvature of the lanes, etc. In order to realise this, according to the invention a characteristic value is determined that exhibits non-fixed transitions and is defined as environment speed. This characteristic value has the dimension of speed (distance/time).

In order to distinguish the type of road on which the driver's vehicle is travelling, the system according to the invention determines in the electronic control unit characteristic values for at least two different road environments (urban traffic, trunk roads, motorways), in which connection a quantity influencing the respective characteristic value is the environment speed, preferably found by calculating the mean value from the speeds of the objects detected in the space in front of the driver's vehicle as well as from the speed of the driver's vehicle. In this connection the road environments do not have fixed limiting values but instead variable limits.

The "environment speed" value is about 120 km/hour–150 km/hour if it is in the "motorway" range. This applies even if the actual speed at which the vehicle is travelling is momentarily lower or higher. In the "trunk road" range the value is about 60 km/hour–100 km/hour. In the "urban traffic" range the value is about 30 km/hour–50 km/hour.

If a journey takes place over a fairly long time at a relatively prolonged high speed and small turning amplitudes, the electronic control unit increases the "environment speed" value stepwise so that it comes into the "motorway" range (120 km/hour–150 km/hour). When driving over a section with a curve radius and with a length such as are normally encountered in motorway journeys and at a corresponding considerably reduced speed, the "environment speed" value is quickly reduced to a value of for example 50 km/hour–70 km/hour, which corresponds to the "trunk road" range, even if the instantaneous speed at which the vehicle is travelling exceeds this value.

In the system according to the invention, in the electronic control unit the "environment speed" value is approximated via a predefined function (for example incline, stage) from an instantaneous contribution at the actual speed of the driver's vehicle. Preferably an approximation from a higher value than the instantaneous contribution of the actual speed is made at a first speed rate and an approximation from a lower value than the instantaneous contribution of the actual speed is made at a second speed rate, preferably considerably higher than the first speed rate. In this way it is ensured that speed reductions of short duration, for example on a motorway in the region of roadworks, or on account of a slower vehicle that has crossed into the lane of the driver's vehicle, do not cause a sudden return into the "trunk road" or even "urban traffic" value range.

Furthermore, in the electronic control unit the "environment speed" value is increased by a predefined function (for example incline, stage) if at least two other objects driving substantially next to one another are located in front of the driver's vehicle and the driver's vehicle is travelling at an actual speed that lies in the "trunk road" range. The "environment speed" value is hereby raised by a third speed rate, preferably considerably larger than the second speed rate. In particular an upper threshold value can be reached in this way if a relatively high speed is reached for a relatively long time on a multi-lane highway outside a built-up area.

Also, the "environment speed" value is reduced to a low limiting value via a predefined function (for example incline, stage) if the "environment speed" value and the instantaneous turning rate of the driver's vehicle were to result in a transverse acceleration that exceeds a threshold value. In this case the "environment speed" value is reduced at a fourth speed rate, preferably considerably higher than the third speed rate. This ensures that the "environment speed" value is reduced very quickly in tight curves.

Finally, the "environment speed" value is limited to a predeterminable multiple (for example 1.2) of the desired speed of the vehicle. This measure is based on the consideration that when there is a change in environment, for example from urban traffic to trunk road or motorway, this is followed by a change, made by the driver, of the desired speed. Thus, also with a relatively smooth traffic flow on multi-lane roads outside built-up areas the "motorway" speed value cannot be achieved without an intervention by the driver.

The "environment speed" value can assume at most a predeterminable lower limiting/threshold value and a predeterminable upper limiting/threshold value.

The curvature progression of the lane on which the driver's vehicle is travelling is differentiated according to the route in the system according to the invention. Depending on the result a "curveness" characteristic value is determined that is independent of the speed of the driver's vehicle.

The result of differentiating the curvature progression of the lane in which the driver's vehicle is travelling is also evaluated in the electronic control unit in order, in the case of long straight sections of the lane, to reduce the "curveness" characteristic value at a predetermined rate over a specified stretch of highway, depending on the above result.

The result of differentiating the curvature progression in the lane in which the driver's vehicle is travelling is also evaluated in the electronic control unit in order in the case of S-curves (two reverse curved sections without a straight intermediate section) to increase the "curveness" characteristic value at a predetermined increment depending on the above result.

In the system according to the invention, if a signal is present that reproduces a curvature of the lane of the driver's vehicle that lies above a first predetermined value, then the "curveness" characteristic value is increased in the electronic control unit at a high increment by a dynamic component, and when the turning rate signal lying above a second predetermined value disappears, the dynamic component is restored. In this way a rapid reduction of the "environment speed" value is achieved, in particular when travelling along curves with a small curve radius, without this causing the vehicle to leave the "motorway" range for the "environment speed" value when for example negotiating motorway junctions or intersections.

In order to improve still further the reduction in the number of incorrect choices, also in the electronic control unit in the system according to the invention the dynamic component in the case of right-hand traffic is added to the "curveness" value only for right-hand curves and in the case of left-hand traffic is subtracted from the "curveness" value only for left-hand curves.

Preferably, in the electronic control unit the dynamic component is modified depending on the average curvature of the lane and the change in direction of travel after entering the curve. In this connection the curve entry is defined as the point in time at which the curvature signal exceeds the first predetermined threshold value. The change in direction of travel is obtained from the integral of the yawing rate of the vehicle over time.

When choosing the target vehicle there is the problem that a desired, earliest possible detection of potential target objects leads of course to an increased stability or rest when "following" this target vehicle already detected a long way in front of the driver's vehicle. In particular in the case of motorways containing curves, there is in this case also the danger of course that a false target vehicle will be selected that is not actually in the driver's lane. The invention accordingly provides a procedure that permits an estimate of how susceptible the actual target choice is to an incorrect selection on account of the environmental situation.

In this connection, in the system according to the invention, those of the priority objects that are more distant than others from the driver's vehicle are, depending on the curveness value, excluded from the choice as target vehicle.

In order to make the selection of priority objects as reliable and efficient as possible, it is advantageous if the system has access to information as to whether the driver's vehicle is moving in an environment with left-hand traffic or right-hand traffic. On the basis of this an asymmetrisation of the selection can be undertaken. According to the invention, based on this information vehicles in the "slower" or "faster" lane than the driver's lane are preferentially excluded as "false priority targets" from the selection, than other vehicles situated in the driver's lane. Also, according to the invention a higher acceleration is effected after moving into the "faster" lane, etc.

In addition, according to the invention, in the case of an "active or passive" overtaking procedure it is established on which side the overtaking vehicle is situated when overtaking. To this end the speeds of vehicles driving in the existing lanes in front of the driver's vehicle are determined in the electronic control unit and from this information a characteristic value is derived that indicates whether the driver's vehicle is in left-hand traffic or right-hand traffic.

In addition the stretch already travelled or a quantity correlated therewith is determined from a predetermined number of the vehicles travelling in front of the driver's vehicle in the existing lanes, and is related to the corresponding quantity for the driver's vehicle by determining the characteristic value as the sum of the difference of the speeds of the vehicles of a first, preferably left-hand, lane and the speeds of the vehicles of a second, preferably right-hand lane.

In order to increase the recognition reliability an upper threshold value and a lower threshold value are defined, in which the electronic control unit generates a "right-hand traffic" signal and stores this if the characteristic value exceeds the upper threshold value, and the electronic control unit generates a "left-hand traffic" signal and stores this if the characteristic value is below the lower threshold value.

Preferably only speeds of vehicles that exceed a predetermined threshold value are taken into account. This avoids incorrect evaluations on account of traffic moving in convoy or in built-up areas.

In order to avoid errors in the lane allocation, vehicles travelling in front of the driver's vehicle are only evaluated if the radius of the lane exceeds a predetermined threshold value.

In order to improve further the selection reliability, the determination can in addition or instead of the evaluation of the speeds of the vehicles in the same direction of travel as the driver's vehicle, also establish on which side of the driver's vehicle vehicles travelling in the opposite direction are situated. In addition, in the case of vehicles with a negative relative speed in relation to the speed of the driver's vehicle, whose contribution is greater than the speed of the driver's vehicle, the sign of the respective characteristic value is reversed in the control unit before the summation procedure.

In this connection, for vehicles with a negative relative speed in relation to the speed of the driver's vehicle, whose contribution is greater than the speed of the driver's vehicle, the characteristic value can be provided with a weighting factor.

Since as explained above, the detection space in front of the driver's vehicle broadens out substantially conically before the front part of the vehicle symmetrically with respect to its mid-line axis with a relatively narrow cone angle, in the case of sharp curves the target vehicle may be "lost".

Immediately after the loss of the target vehicle it may then happen that the speed of the driver's vehicle is increased by the electronic control unit. The result of this is that the vehicle travels at increased speed on a curve situation or accelerates in the curve. Consequently the driver must intervene and brake. In order to avoid this, according to the invention a control signal is generated in the electronic control unit if it is established that a target vehicle is leaving the detection space in front of the driver's vehicle, which control signal limits at least for a section the instantaneous speed or the instantaneous acceleration of the driver's vehicle to a value that substantially corresponds at most to the distance X between the driver's vehicle and the target vehicle at the time when the latter leaves the detection space.

In this way the speed of the driver's vehicle remains constant or increases only slightly until the driver's vehicle has reached the curve or the place at which the target vehicle was "lost". This means a considerable gain in comfort and safety, since even on sections containing many curves scarcely any or indeed no braking actions by the driver are necessary. The driver basically still only has to control/steer the vehicle, while the target vehicle, due to its deceleration on approaching a curve or acceleration after leaving a curve, supplies the corresponding "correction" for the electronic control unit in the driver's vehicle. The electronic control unit correspondingly bridges the time between "losing" and "finding" the target vehicle again.

Since the loss of the target vehicle as a rule occurs only when the latter is already on the curve, in a preferred embodiment the distance X between the driver's vehicle and the target vehicle at the time the target vehicle leaves the detection space is reduced in the electronic control unit by a shortening section DX to an effective distance Xeff. The shortening section DX has to be changed depending on the environment (motorway, trunk road, urban traffic), the speed of the target vehicle at the time the latter leaves the detection space, the instantaneous speed of the driver's vehicle, the curve radii of curves already previously traversed within a predetermined period of time, or the like.

In this connection the shortening section DX can also be determined from the average value of the curve radii of curves already previously traversed within a predetermined period of time.

The control signal contains information on the latter, or is characteristic of a maximum time duration that is obtained from the instantaneous speed of the driver's vehicle and the distance X between the driver's vehicle and the target vehicle at the time the latter leaves the detection space, or is obtained from the effective distance Xeff.

In order to improve further the reliability when selecting the target vehicle, the determination can also establish whether an object that is situated in the detection space in front of the driver's vehicle falls short of a predetermined distance and is not located in the lane of the driver's vehicle, is to be excluded from the choice of priority object. This strategy according to the invention takes into account the fact that for targets at a small distance from the driver's vehicle, the position determination can no longer be carried out with the necessary accuracy. Since such objects are still detected by the so-called side lobes of a radar sensor, it appears as if they had cut into the driver's lane from an adjacent lane.

Furthermore, an object that is located on the mid-line axis of the sensor of the driver's vehicle outside a predetermined angle or that exceeds a predetermined angle can be excluded from the choice of priority object.

The same also applies to an object that was not a target object during a predetermined period of time in the past.

Other advantages of this invention will become apparent to those skilled in the art from the following detailed description of the preferred embodiment, when read in light of the accompanying drawings.

BRIEF DESCRIPTION OF THE DRAWINGS

FIG. 9 illustrates the behaviour of a vehicle with a system according to the invention for evaluating the driving environment of a vehicle on a curved section of carriageway when the target vehicle is lost.

DETAILED DESCRIPTION OF THE INVENTION

Figure 1:
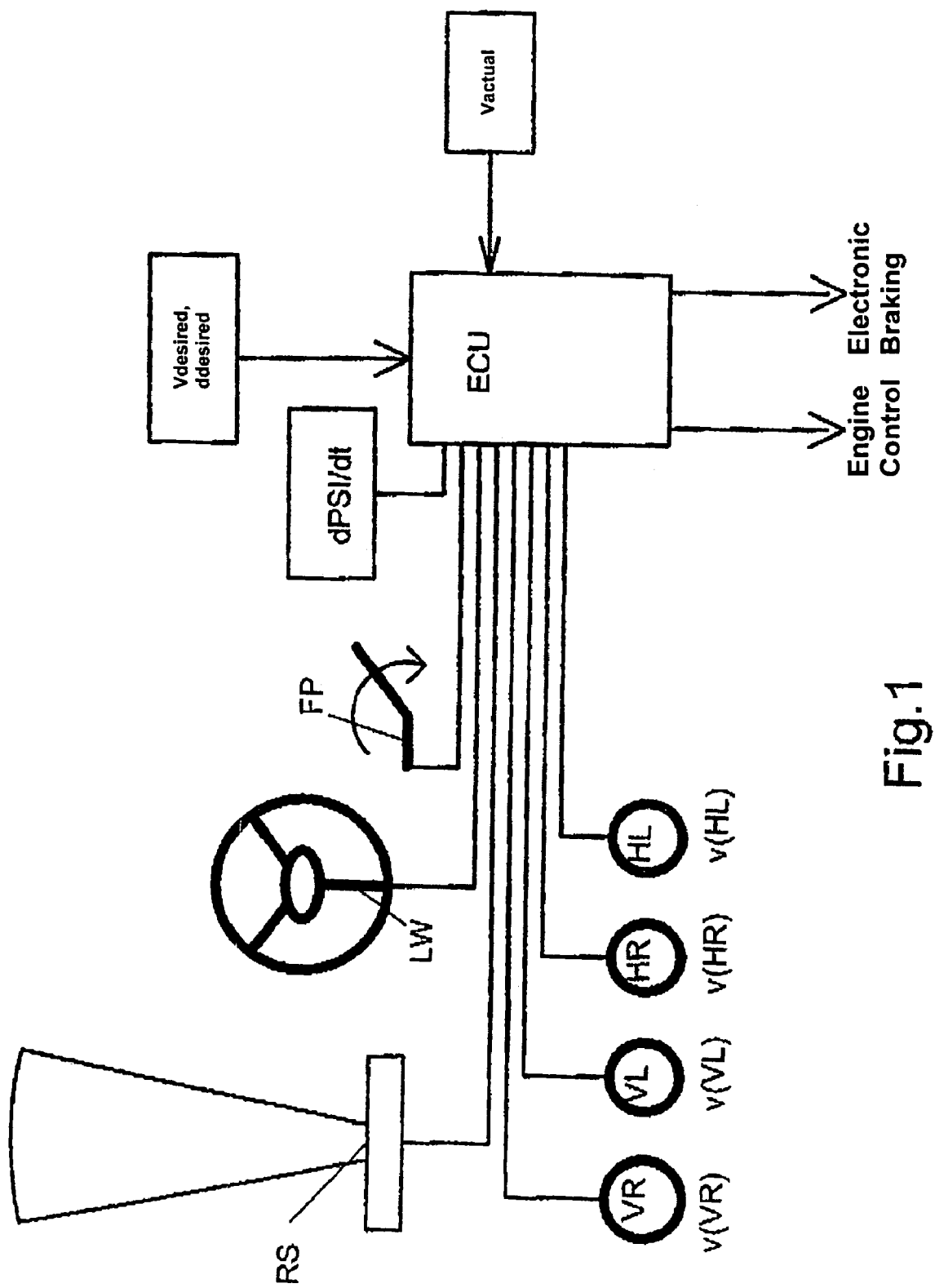
FIG. 1 is a schematic block diagram of an embodiment of a system according to the invention for evaluating the driving environment of a vehicle.

FIG. 1 shows an embodiment of a schematic block diagram of a system according to the invention for evaluating the driving environment of a vehicle and for influencing the speed of the vehicle. This system has an electronic control unit ECU, which is connected to a signal generator that generates a signal characteristic of the desired speed Vsoll of the vehicle. In addition the electronic control unit ECU receives from a signal generator acting as a yawing rate sensor, a signal characteristic of the turning rate dPSI/dt of the vehicle about its vertical axis. Also, the electronic control unit ECU is connected to a signal generator acting as radar sensor RS.

The radar sensor RS generates for objects situated in the space in front of the vehicle in the direction of travel of the vehicle, characteristic signals with respect to their distance and orientation relative to the vehicle, which signals are passed to the electronic control unit ECU and are processed further in the latter in a manner described in more detail below. In addition the electronic control unit ECU receives from signal generators acting as wheel rotational speed sensors, as are necessary for example also for the ABS operation, signals v(VL), v(VR), v(HL), v(HR) characteristic of the speeds of the wheels VL, VR, HL, HR of the vehicle. As signal generator for the steering angle lock of the vehicle steering wheel, an angle of rotation generator LW is connected to the electronic control unit ECU, and as signal generator for the setting of the accelerator pedal of the vehicle, an angle of rotation generator FP is likewise connected to the electronic control unit ECU. The electronic control unit ECU is connected to control devices in the form of the engine management system or to the electrical or electrohydraulic braking system that have an influence on the driving behaviour of the vehicle, in order to feed to these devices output signals that are derived from the driving behaviour of the vehicle in front of the driver's vehicle and possibly from the driving environment.

The radar sensor RS continuously scans the space in front of the vehicle and generates signals that are characteristic of objects X located in the space in front of the vehicle, as regards their distance and orientation relative to the vehicle. In particular the speed v_rel_X of the object X relative to the speed v of the driver's vehicle, the distance d_x relative to the driver's vehicle, the angular displacement Alpha_x or the lateral deviation relative to the longitudinal axis of the driver's vehicle are constantly measured and evaluated in the electronic control unit ECU (see FIG. 2).

Figure 2:
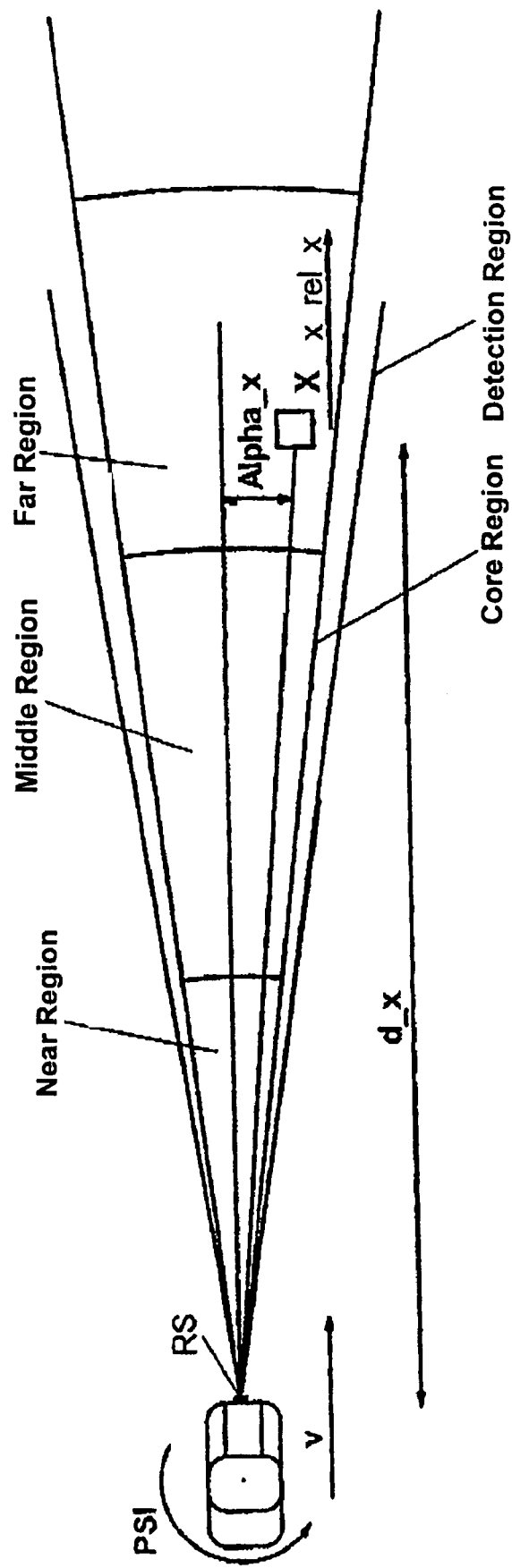
FIG. 2 explains the relationships of the individual physical quantities detected by the radar sensor in the system according to the invention for evaluating the driving environment of a vehicle according to FIG. 1.

As illustrated in FIG. 2, the space in front of the vehicle scanned by the sensor is roughly conical or lobate in shape and has, depending on the actual environmental circumstances, a length of about 200–250 metres and a cone angle of about 12°. However, in order to improve the evaluation reliability only objects in a core region of about 8°–10° are considered. A reliable detection can thus be carried out for objects that are at a distance of at most about 200±30 metres from the driver's vehicle or that are moving in front of the latter within or below this range. This substantially rectangular lane is simulated as data structure in the electronic control unit ECU and is subdivided into a near region (for example about 0–50 metres), a far region (for example 150+ metres) and a middle region (for example 50–150 metres).

In this connection the data signals may originate from special sensors provided for the system according to the invention in the vehicle or from sensors that are also provided for other vehicle systems (brake control, "electronic steering wheel", EPS or the like) and their data may be fed into a bus system provided in the vehicle (for example CAN-BUS).

Figure 3:
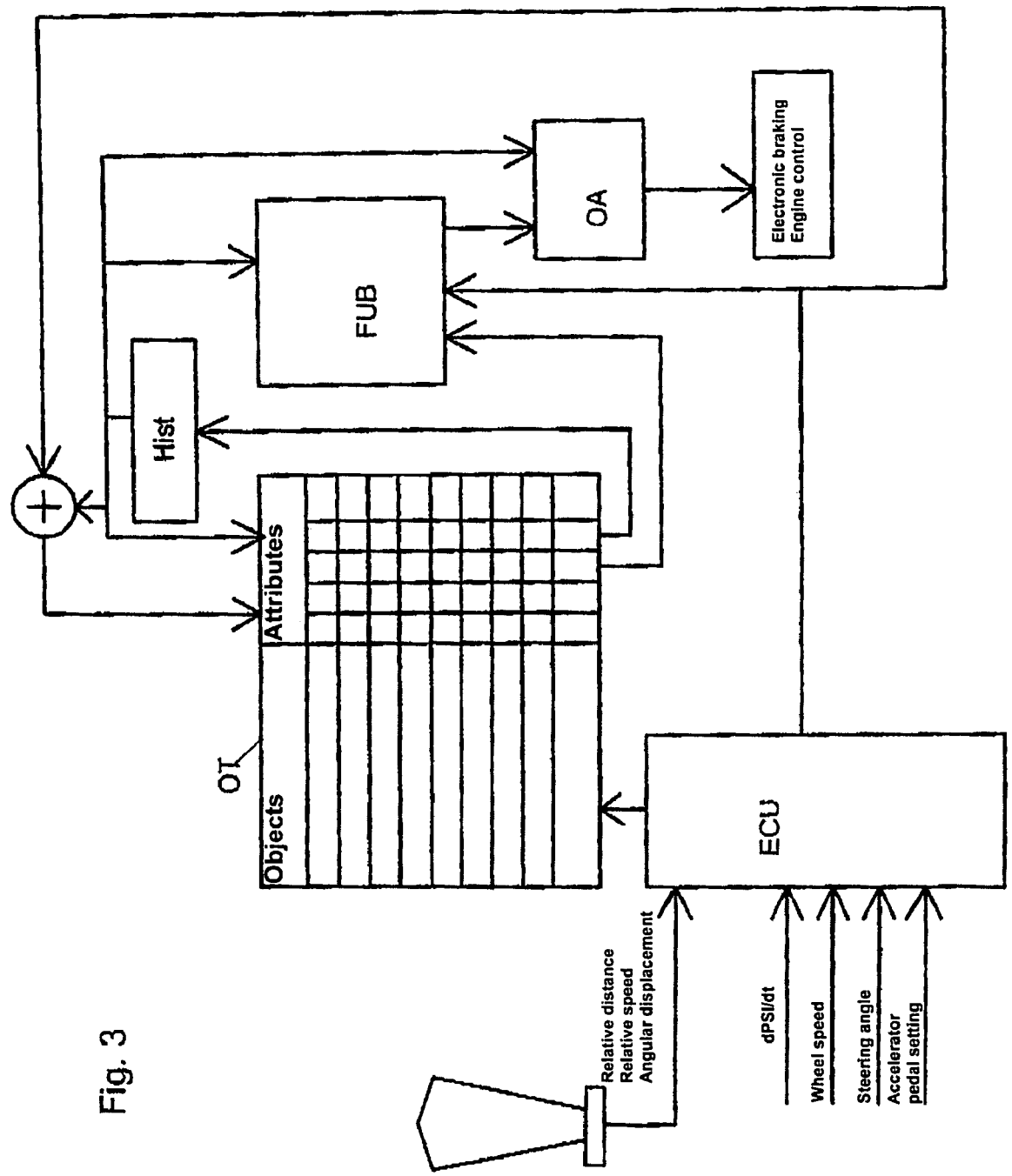
FIG. 3 illustrates how the system according to the invention shown in FIG. 1 processes the data signals received from the various sensors.
Figure 4:
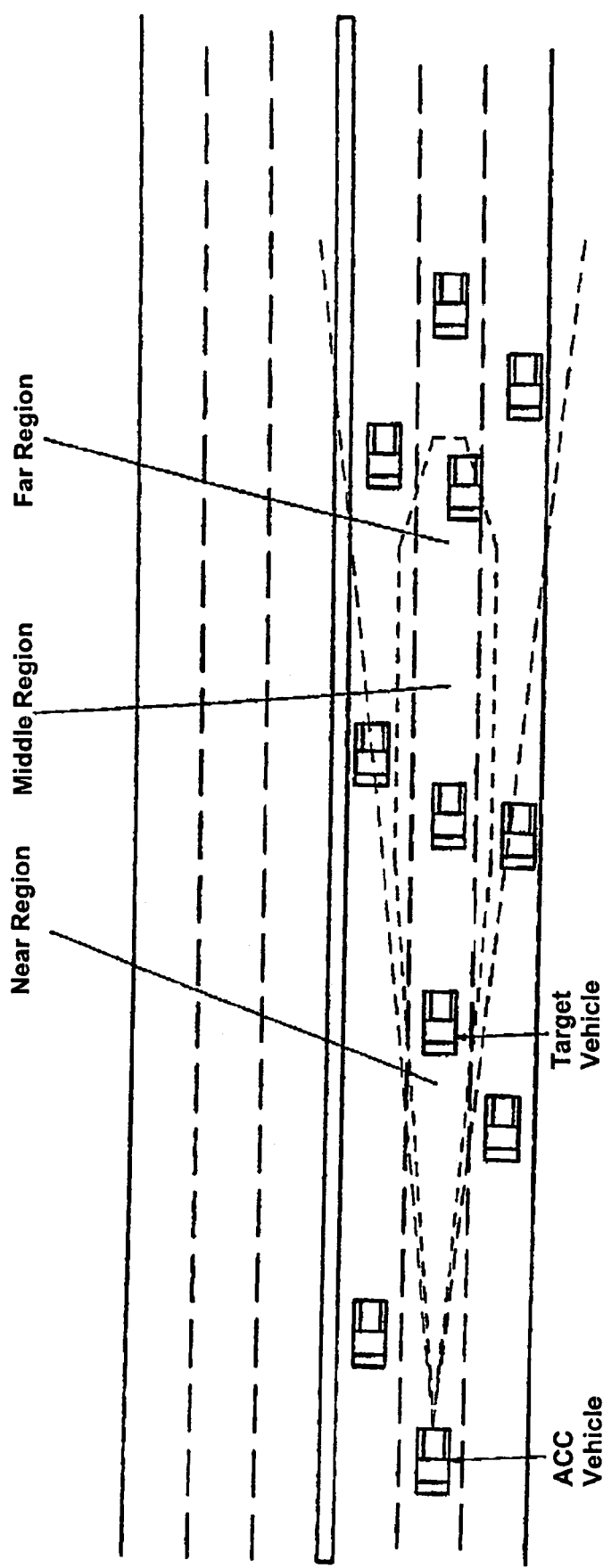
FIG. 4 illustrates the situation of a vehicle with a system according to the invention for evaluating the driving environment of a vehicle on a multi-lane straight section of highway.

FIG. 3 illustrates how the electronic control unit ECU processes the data signals received from the various sensors and generates data that are stored in tables or description objects and are optionally constantly updated. An essential part of the system according to the invention consists of an object table OT, in which are itemised objects (moving and possibly also static objects) located in the space in front of the vehicle, together with their attributes (for example speed relative to the speed of the driver's vehicle, the distance relative to the driver's vehicle, the angular displacement or the lateral deviation relative to the longitudinal axis of the driver's vehicle, how long a certain object is already included in the object table OT, how often it has executed a change of lane, etc.), i.e. their object descriptions. From the object table OT and its history HIST, i.e. from object descriptions relating to the past, a vehicle environment description FUB is generated (i.e. whether the vehicle is moving in left-hand or right-hand traffic, is travelling on a motorway, a trunk road or in urban traffic, how many lanes the road on which the vehicle is currently travelling has, in which lane the vehicle is currently situated, does the road on which the vehicle is currently travelling have curves, and if so to what extent, or is the road straight, etc.), from which, together with the history HIST of the object table OT and the current data in the object selection OA, an object is selected from the object table OT as target vehicle, which is used as "vehicle travelling in front" in order to match the behaviour of the driver's vehicle (speed vsoll, distance dsoll, etc.) to the driving behaviour of the vehicle in front, as is shown in FIG. 4.

In order to define the mid line of the driver's lane in the space detected in front of the driver's vehicle, the radius of curvature R of the path curve of the centre of gravity of the driver's vehicle is modified in the electronic control unit ECU on the basis of the change of the angular bearing of the objects driving in front and the absolute position of the objects in front, compared to the instantaneously predicted lane. This means that in the electronic control unit ECU the distance relative to the instantaneous position in the lane is determined for the driver's vehicle, and after its traversal the radius of curvature R of the path curve of the centre of gravity of the driver's vehicle changes. The extent of the change is in this connection determined from the change in the angular bearing of the objects in front and on their absolute position relative to the instantaneously predicted lane. In other words a "predictive driving" takes place, in which the driver's vehicle can be prepared in advance for this, when and at what distance relative to the instantaneous position a reduction of the speed of the driver's vehicle is indicated, since the vehicles in front also happen to be in a curve situation.

In order to make as accurate a prediction as possible of how the radius of curvature R of the path curve of the centre of gravity of the driver's vehicle changes, the lateral speeds of the objects moving in the space detected in front of the driver's vehicle are evaluated in the electronic control unit ECU and are filed as attribute in the object table OT and updated. Similarly, the residence time of the objects moving in the space detected in front of the driver's vehicle as well as their speed and distance in the direction of travel of the driver's vehicle are measured and processed in order to modify the radius of curvature R depending on their residence time or speed and/or distance from the driver's vehicle.

Figure 5:
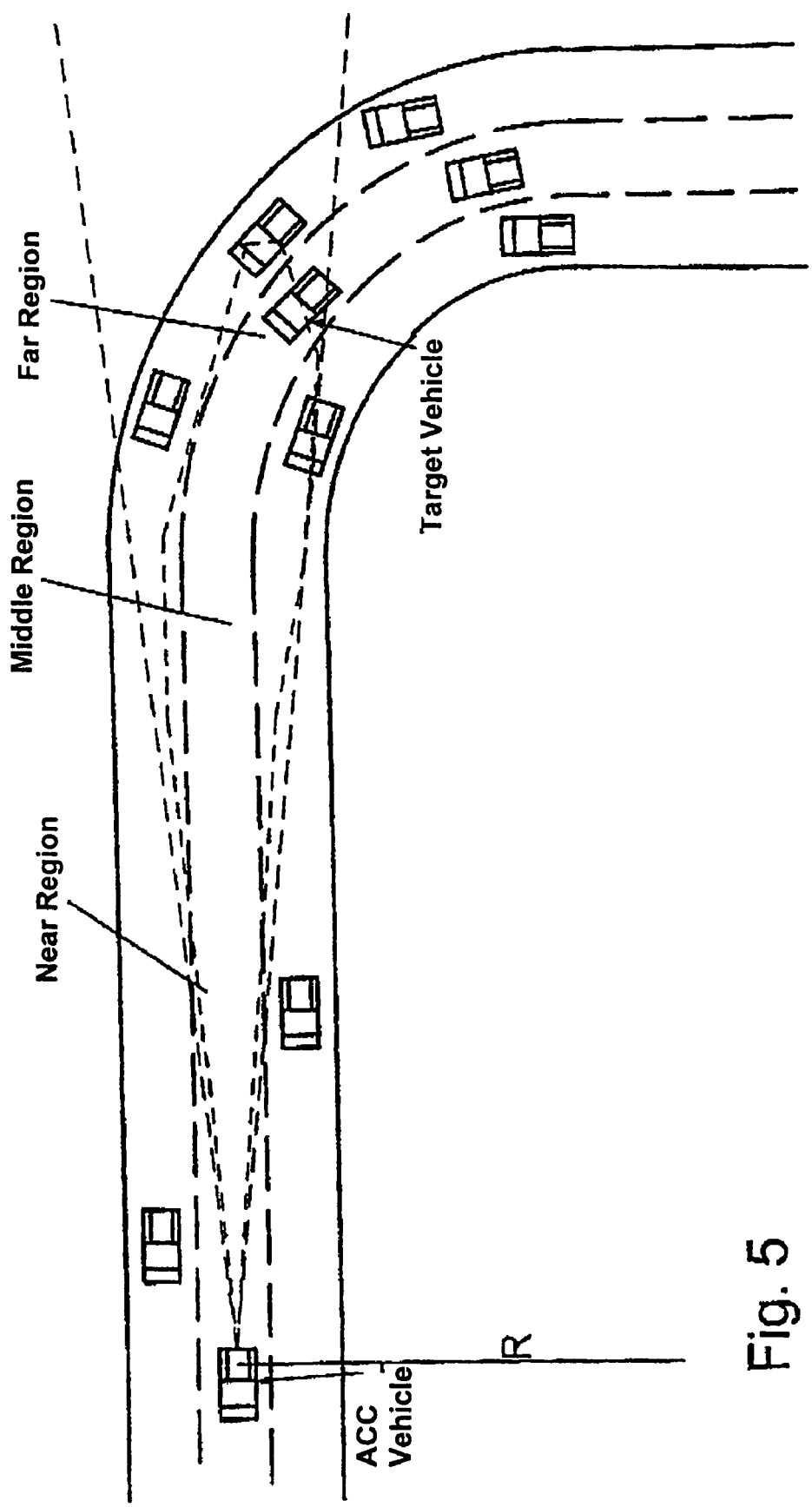
FIG. 5 illustrates the situation of a vehicle with a system according to the invention for evaluating the driving environment of a vehicle on a multi-lane curved section of highway.

In the driving environment description FUB (FIG. 3) the course and the width of the lane of the driver's vehicle in the space in front of the latter are also filed as description and updated. As illustrated in FIGS. 4 and 5, in the driving environment description FUB the width of the driver's lane is modified in the electronic control unit ECU depending on the distance to the driver's vehicle, the maximum width in the near region and in the far region being less than in the middle region. In this connection the width of the driver's lane is specified in the electronic control unit ECU only at those points in the space in front of the driver's vehicle at which objects are also present in the detected space in front of the driver's vehicle.

As is likewise illustrated in FIGS. 4, 5, in the driving environment description (FIG. 2) the width of the driver's lane is modified in the electronic control unit ECU depending on the distance of detected objects in the space in front of the driver's vehicle and on the orientation of a curve, so that at a large distance the width on the outside of the curve decreases and at a middle distance the width on the inside of the curve increases. Also, the width of the driver's lane can be widened in the electronic control unit ECU on both sides at the point at which a target vehicle, on the driving behaviour of which the driving behaviour of the driver's vehicle is to be dependent, is located.

Furthermore, in the driving environment description FUB the driver's lane is widened on both sides by the electronic control unit (ECU), at the point at which the target vehicle is located, depending on the duration for which the driving behaviour of the driver's vehicle is dependent on the driving behaviour of this target vehicle, (see FIG. 5). In a corresponding way the width of the driver's lane is modified in the electronic control unit ECU depending on the speed of the driver's vehicle and/or on the curveness of the road on which the driver's vehicle is moving. In order to determine the curveness a procedure according to the invention is described in further detail hereinbelow.

Figure 5A:
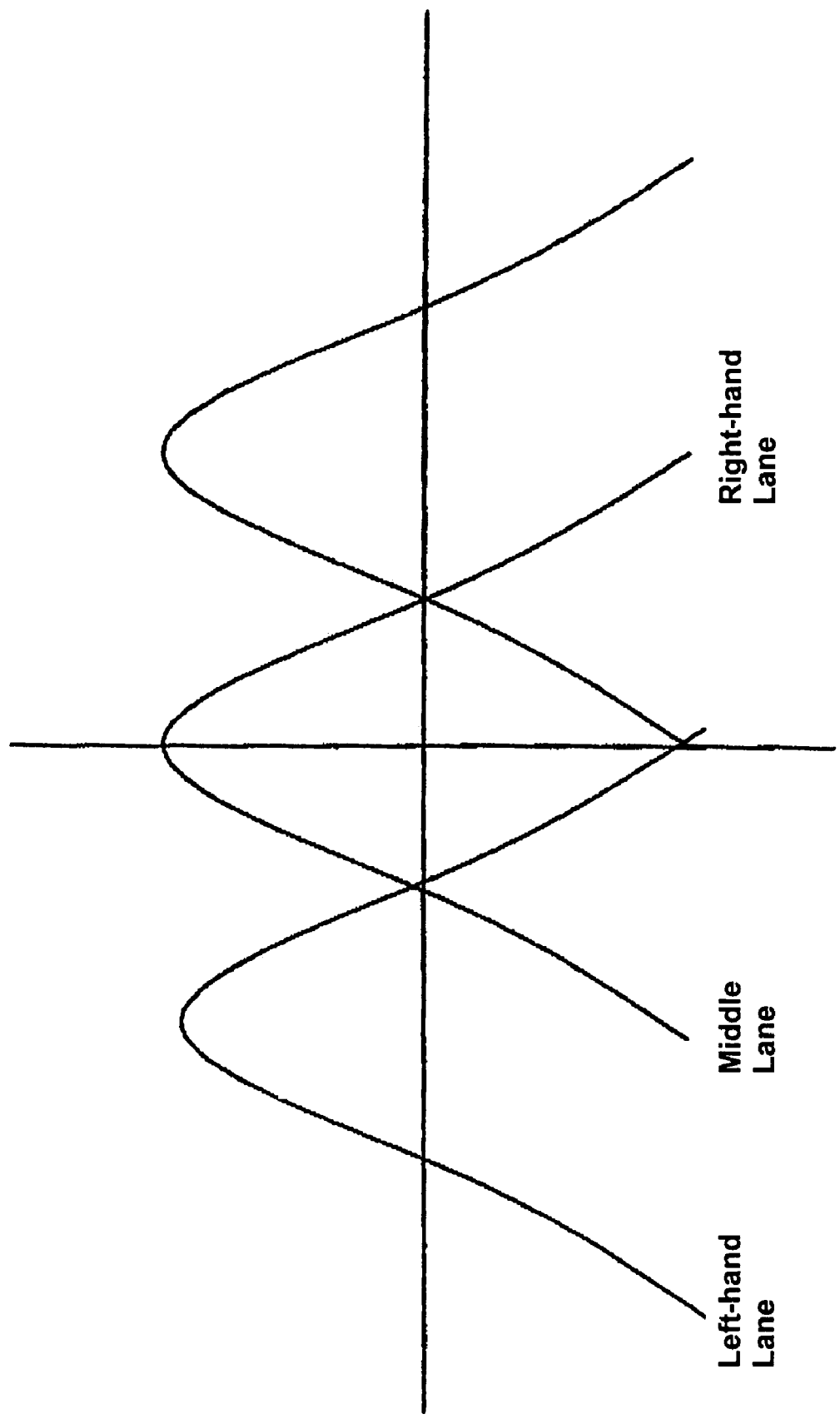
FIG. 5a shows the probability distribution that a vehicle is encountered in a left-hand, central or right-hand lane.

A further feature that plays a role in the choice of an object as target vehicle is its lane. For this purpose the objects located in the space in front of the driver's vehicle are classified as regards their instantaneous position compared to the lane width at the corresponding distance to the driver's vehicle. Moving objects detected in front of the driver's vehicle are classified in the electronic control unit ECU as objects in the driver's lane if an object situated further than a minimum distance away is present in the driver's lane for a predetermined period of time that is related to the sum of the residence time in one or both adjacent lanes, and which exceeds a threshold value. In this case this object is filed together with the corresponding attributes in the object table OT. The classification of a vehicle as being for example in the middle lane—in which the driver's vehicle is also located—presupposes that it is located within the corridor with the corresponding width for the instantaneous distance of the vehicle. If the vehicle moves to the left outside the corridor that defines its own lane, it is then classified as driving in the left-hand lane; if it moves to the right outside the corridor that defines its own lane, it is classified as driving in the right-hand lane (see for example FIG. 5). FIG. 5a illustrates the probability distribution of encountering a vehicle in a left-hand, middle or right-hand lane. A corresponding value is filed in the object table OT and updated for each of the objects.

The predetermined time frame may in this connection be modified in the electronic control unit ECU depending on the speed of the driver's vehicle and filed in the object table OT.

In addition the threshold value can be reduced in the electronic control unit ECU as the distance of the object from the driver's vehicle becomes less.

Furthermore, the residence duration of all objects for the existing lanes is determined with reference to the driver's lane and weighted over time. This is filed as an attribute in the object table OT. More recent appearances of objects in the lane of the driver's vehicle are evaluated higher than less recent appearances, and spatially more distant appearances of objects in the lane of the driver's vehicle are evaluated lower than spatially closer appearances.

From the existing lanes a maximum of two moving objects are selected in each case by the electronic control unit ECU as priority objects in the object table OT and are provided with a corresponding characterisation as attribute in the object table OT if they have been detected as such moving in front of the driver's vehicle for a period of time above a minimum value. This respective duration is weighted less for objects located very close to the driver's vehicle (0–30 m) and for objects located very far from the driver's vehicle (120–200 m), and is weighted more strongly for objects lying therebetween.

For each priority object characterised in this way in the object table OT the electronic control unit ECU determines how far each priority object changes its lateral position relative to the mid line of the lane of the driver's vehicle. The sum of the mean values of the lateral position changes of the priority objects is calculated by the electronic control unit ECU as the change value of the lane of the driver's vehicle at the respective distance to the driver's vehicle, and is likewise filed in the object table OT.

By means of the object selection OA (FIG. 4), the electronic control unit ECU selects as target vehicle from the priority objects that object, on the driving behaviour of which the driving behaviour of the driver's vehicle is to be dependent, that is moving in the lane of the driver's vehicle, has a direction of movement over the ground that coincides substantially with the direction of movement of the driver's vehicle, and that has been detected in the space in front of the driver's vehicle for a predetermined period of time that is read from the object table OT and its history HIST.

In this connection, for each of the priority objects the transverse speed relative to the mid line of the driver's lane is also included as an attribute in the object table OT, and updated. This enables the target vehicle to be selected also according to the criterion that this transverse speed does not exceed a threshold value, which may possibly also change depending on the distance of the respective object from the driver's vehicle.

Figure 6:
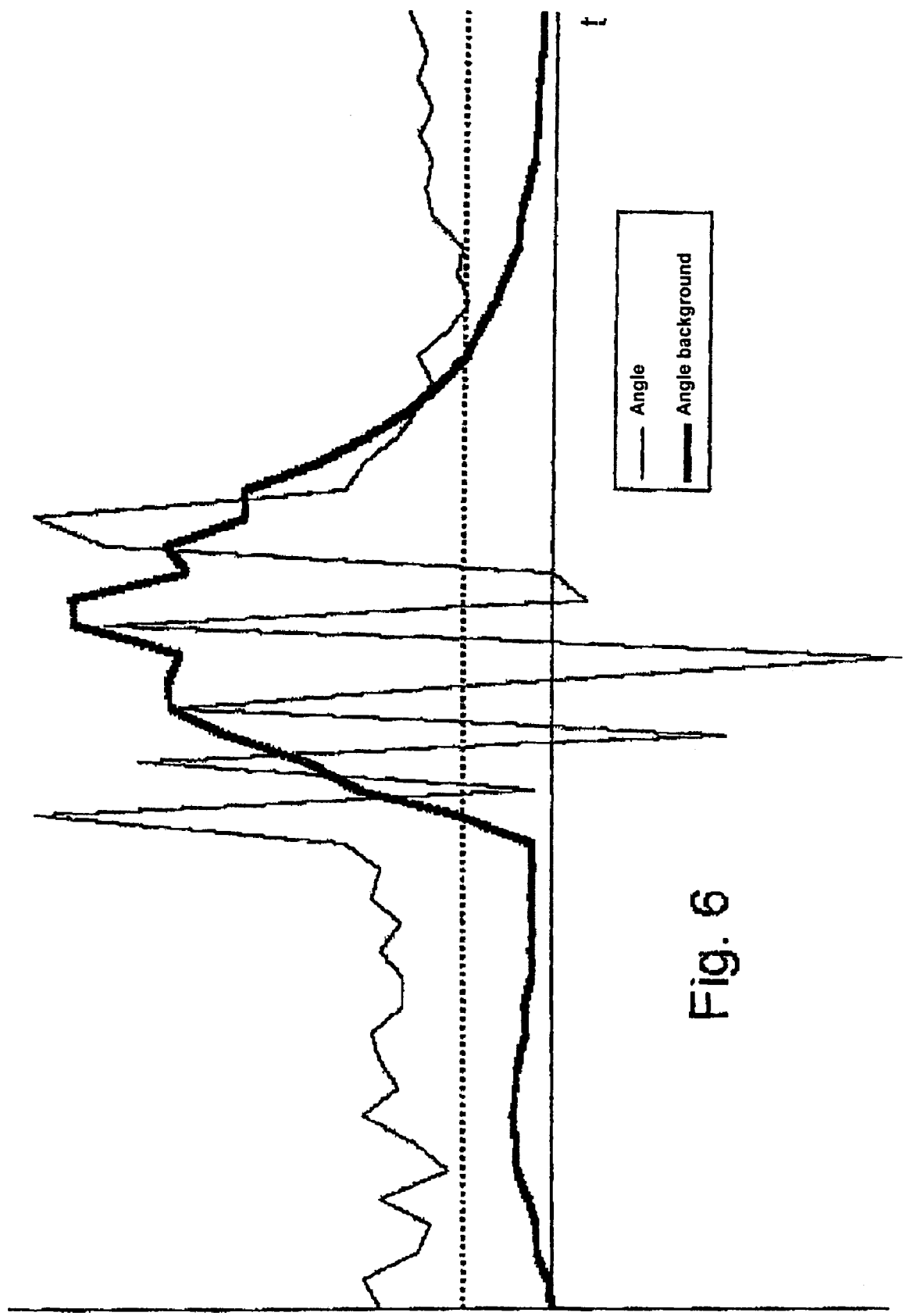
FIG. 6 shows the calculated background noise amplitude of the bearing angle for each of the objects.

Furthermore, as shown in FIG. 6, the background noise amplitude of the bearing angle with respect to the mid longitudinal axis of the driver's vehicle is recorded as an attribute in the object table OT for each of the objects selected as priority objects, and is optionally included in the history HIST. In this way it is possible to evaluate in the electronic control unit ECU the time progression of the background noise amplitude of the bearing angle at each of the priority objects. According to the invention the background noise signal is to this end filtered in a low-pass filter in order to remove short-term angle amplitudes. If a threshold value dependent on the distance is exceeded, this priority object is excluded from the choice of target vehicle, on the driving behaviour of which the driving behaviour of the driver's vehicle is to be dependent.

Likewise a priority object is excluded from the choice of target vehicle, on the driving behaviour of which the driving behaviour of the driver's vehicle is to be dependent, if its distance from the driver's vehicle is greater than a distance threshold value, the absolute value of the bearing angle to this priority object is greater than an angle threshold value (for example 4°), and this priority object was not previously selected as target vehicle. Also, for this purpose the continuous recording of the background noise amplitude of the bearing angle with respect to the mid longitudinal axis of the driver's vehicle is very useful as an attribute in the object table OT for each of the objects selected as priority objects and possibly their inclusion in the history HIST.

In the electronic control unit ECU a change of lane of the driver's vehicle is recognised if the change in the bearing angle at the target vehicle, on the driving behaviour of which the driving behaviour of the driver's vehicle is to be dependent, exceeds a specified threshold value and is substantially equal to the turning rate of the driver's vehicle with reverse sign. The turning rate of the driver's vehicle can be derived from the signal of the yawing rate sensor (see FIG. 1), which supplies a signal characteristic of the turning rate dPSI/dt of the vehicle about its vertical axis. Also necessary for this evaluation is the continuous recording of the bearing angle of the target vehicle with respect to the mid longitudinal axis of the driver's vehicle and its background noise amplitude as an attribute in the object table OT and their inclusion in the history HIST.

Figure 7:
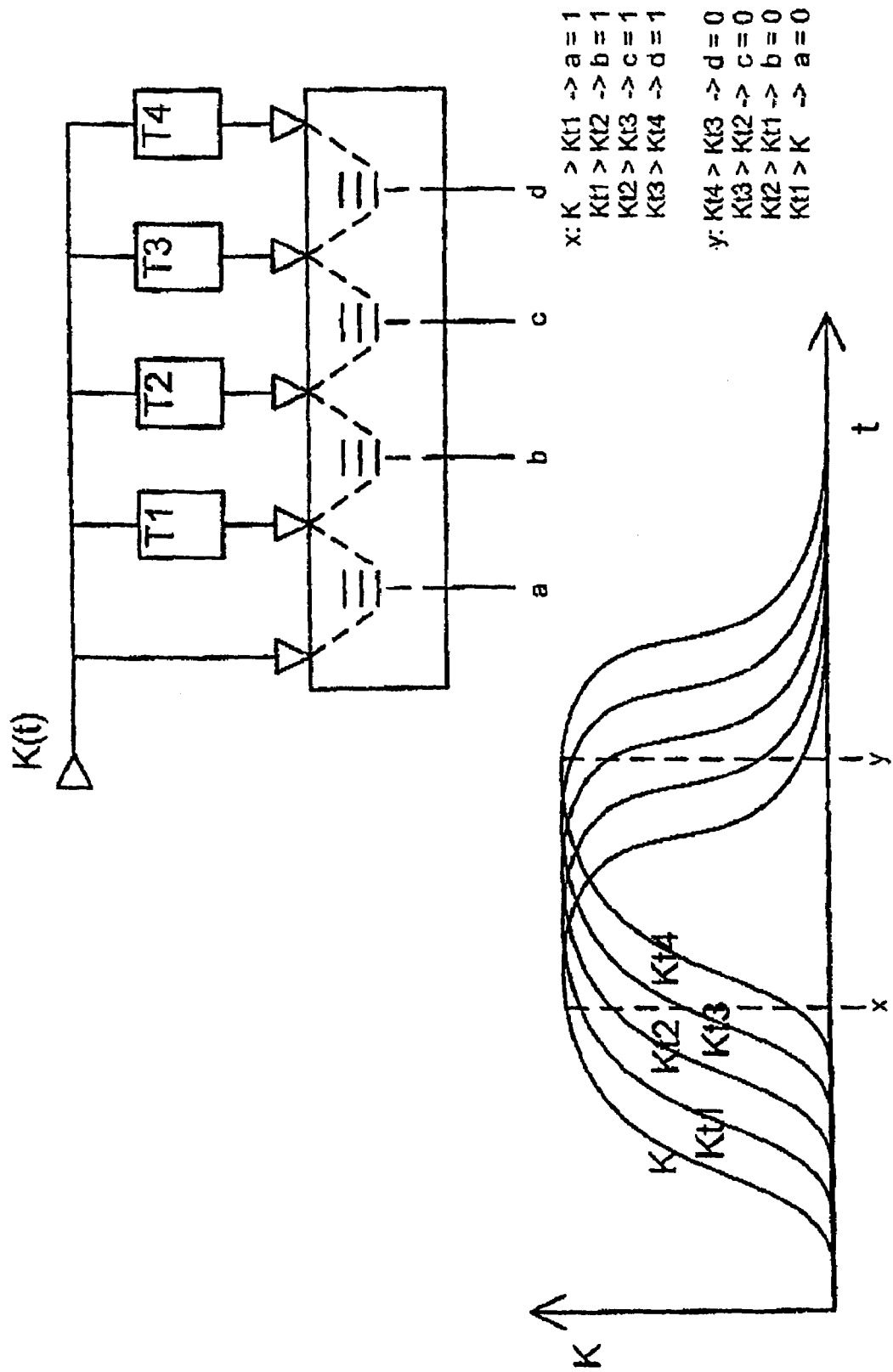
FIG. 7 shows a schematic block diagram and associated input and output signals for the recognition of left-hand or right-hand curves in a system according to the invention for evaluating the driving environment of a vehicle.

As shown in FIG. 7, in the electronic control unit ECU a quantity K(t) related to the curvature of the lane of the driver's vehicle is fed as input signal in parallel to a plurality of $1^{st}$ order low-pass filters T1, T2, T3, T4 with different time constants. This quantity may for example be the curve radius determined in the manner described above or its reciprocal value, or the turning rate of the vehicle.

The output signals from the low-pass filters and the input signal are in each case compared with one in order to recognise in the progress of the driver's vehicle on the road a transition from a curve of one orientation to a curve of the opposite orientation. This takes place in the electronic control unit ECU in such a way that a transition is recognised if the output signals have a respective minimum interspacing and the output signal of a respective low-pass filter is smaller than the output signal of a low-pass filter with a smaller time constant and is larger than the output signal of a low-pass filter with a larger time constant, or the output signal of a respective low-pass filter is larger than the output signal of a low-pass filter with a smaller time constant and is less than the output signal of a low-pass filter with a larger time constant.

In FIG. 7 this is illustrated in the way that the four comparisons used in the example are carried out at two points in time X, Y. If the individual results (output signals a, b, c, d) of the four comparisons change in succession from 1, 1, 1, 1 to 0, 0, 0, 0, it can be concluded from this that a curve transition has taken place.

A further aspect of the system according to the invention consists in establishing in which environment the driver's vehicle is currently present. For this purpose, in the electronic control unit ECU an "environment speed" value is passed to the vehicle environment description FUB (see FIG. 2) and regularly updated. In order to distinguish the type of road on which the driver's vehicle is travelling, characteristic values with non-fixed limits are determined in the electronic control unit for three different road environments (urban traffic, trunk road, motorway).

This value is approximated in stages from an instantaneous contribution at the speed at which the driver's vehicle is actually travelling. The actual speed of the driver's vehicle is in this connection derived from the accelerator pedal signal FP (see FIG. 1) or from a tachometer signal (not described in further detail). According to the invention an approximation is made from a higher value than the instantaneous contribution of the actual speed of travel with a first speed rate and an approximation from a lower value than the instantaneous contribution of the actual speed of travel with a second speed rate, considerably higher than the first speed rate.

Also, the "environment speed" value is approximated in stages from an instantaneous contribution at a value that lies in the motorway range (for example 150 km/hour), if at least two other objects moving substantially next to one another are present in front of the driver's vehicle.

In addition the "environment speed" value is approximated in stages from an instantaneous contribution at a lower limiting value. If a transverse acceleration that exceeds a threshold value were to result from the "environment speed" value and the instantaneous turning rate of the driver's vehicle, the "environment speed" value is reduced at a fourth speed rate, considerably higher than the third speed rate, until this transverse acceleration no longer exceeds the threshold value.

Finally, the "environment speed" value is restricted to a predeterminable multiple (for example 0.5–1.5) of the desired speed of the driver's vehicle as well as to a predeterminable lower threshold value (for example 40 km/hour) and a predeterminable upper threshold value (for example 160 km/hour).

The "environment speed" value is important in many respects for the functioning of the system according to the invention, since it influences other parameters and is used in their determination, modification and updating. On the other hand further quantities derived from the driving behaviour of the driver's vehicle or other vehicles and that provide feedback on the environment also have an influence on these parameters. One of these derived quantities is the curvature progression of the road on which the driver's vehicle is currently situated; in mathematical terms, this is the change in the behaviour of the inverse of the curve radius over distance. According to the invention this curvature progression is differentiated over distance. Depending on the result, a "curveness" characteristic value is obtained.

Depending on the result obtained by differentiating the curvature progression with respect to distance, with a sequence of curve changes over a specified stretch the "curveness" changes at a predetermined rate dependent on the speed of the driver's vehicle and/or on the distance to the target vehicle.

In the electronic control unit ECU the curvature progression is also differentiated with respect to distance and, in the case of long straight sections over a specified stretch of road, depending on the result the "curveness" value is reduced at a predetermined rate that is preferably dependent on the speed of the driver's vehicle and/or on the distance to the target vehicle and/or on the length of the aforementioned straight section.

Similarly, if it is recognised that the vehicle is travelling on an S-shaped curve, i.e. two curve sections of opposite orientation without a straight intermediate part or with only a relatively short intermediate part, then depending on the result the "curveness" value is increased at a high rate.

A further factor influencing the "curveness" value is the integral of the turning rate signal dPSI/dt of the vehicle about its vertical axis, which reproduces the change in direction of the driver's vehicle over the ground. Depending on this, the "curveness" value is increased at a high rate by a dynamic component. By ignoring the turning rate signal above a predetermined value the dynamic component is restored again to the previous value.

In this connection the system according to the invention envisages adding the dynamic component to the "curveness" value or subtracting it from this value in the case of right-hand traffic only for right-hand curves, and in the case of left-hand traffic only for left-hand curves. The way and means in which right-hand traffic or left-hand traffic is recognised is described further hereinbelow. The dynamic component is also modified depending on the speed of the driver's vehicle.

Depending on the "curveness" determined in this way, the geometry of the driving corridor can be comprehensively matched (for example shortened) to the choice of the target relevant to the regulation, so that an incorrect target choice in curve transitions is avoided.

Similarly, when selecting the target vehicle those vehicles are preferred that "drift in and out" relatively little.

A further criterion in the choice of a priority object is that an object that is in the detection space in front of the driver's vehicle and that falls short of a predetermined distance and is not situated in the lane of the driver's vehicle, is excluded from the choice of priority object.

Also, an object that is situated outside a predetermined angle with respect to the mid longitudinal axis of the driver's vehicle or that exceeds a predetermined angle is excluded from the choice of priority object.

Figure 8:
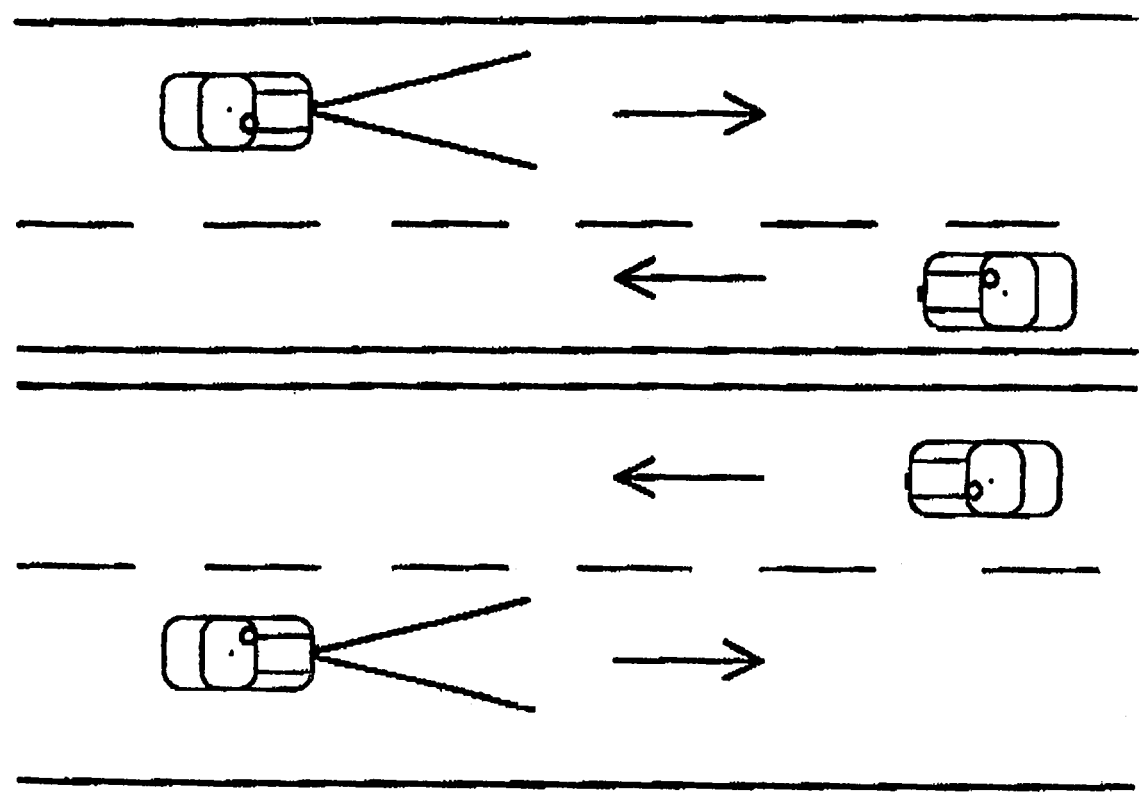
FIG. 8 shows the situation of a vehicle with a system according to the invention for evaluating the driving environment of a vehicle when recognizing whether the vehicle is moving in right-hand traffic or left-hand traffic.

In order to recognise left-hand or right-hand traffic, for vehicles travelling in the existing lanes in front of the driver's vehicle their speed is determined in the electronic control unit ECU, and from this a characteristic value is derived that specifies whether the driver's vehicle is situated in left-hand traffic or right-hand traffic. This is illustrated in FIG. 8, in which a left-hand traffic situation (such as for example in Great Britain or Japan) is shown at the top and a right-hand traffic situation (such as for example in continental Europe or in the USA) is shown at the bottom.

In order to recognise where the driver's vehicle is situated, the stretch already traversed by a predetermined number of the vehicles driving in the existing lanes in front of the driver's vehicle or a quantity correlated therewith is determined and related to the corresponding quantity for the driver's vehicle. For this purpose the characteristic value is determined as the integral of the differential speeds of the vehicles of a first, preferably the left-hand lane, and the differential speeds of the vehicles of a second, preferably the right-hand lane, in relation to the speed of the driver's vehicle. In order to increase the recognition certainty an upper threshold value and a lower threshold value are specified, whereby the electronic control unit ECU generates a "right-hand traffic" signal and stores it in the traffic environment description FUB if the characteristic value exceeds the upper threshold value, and generates a "left-hand traffic signal" and stores it in the traffic environment description FUB if the characteristic value is less than the lower threshold value.

In this connection, only speeds of vehicles that exceed a predetermined threshold value (for example 10 km/hour) are considered for the recognition of left-hand or right-hand traffic. Also, for the recognition of left-hand or right-hand traffic vehicles travelling in front of the driver's vehicle are evaluated only if the radius of the lane exceeds a predetermined threshold value (for example 25–50 m).

In the evaluation for recognizing left-hand or right-hand traffic, characteristic values of vehicles with a negative relative speed with respect to the speed of the driver's vehicle, the contribution of which is greater than the speed of the driver's vehicle, are provided with a weighting factor. By means of the weighting factor it is determined to what extent oncoming traffic is taken into account, in which connection for the vehicles recognized as oncoming traffic the relative speed is taken as negative.

A further functionality of the system according to the invention is described hereinafter with respect to FIG. 9. If a target vehicle leaves the detection space in front of the driver's vehicle, a control signal is generated in the electronic control unit ECU that restricts the instantaneous speed or the instantaneous acceleration of the driver's vehicle, at least for a stretch, to a value that substantially corresponds at most to the distance X between the driver's vehicle and the target vehicle at the time the latter leaves the detection space.

For this purpose the distance X between the driver's vehicle and the target vehicle is constantly measured. If the target vehicle leaves the detection space of the radar sensor RS of the driver's vehicle, the distance is reduced by a shortening stretch DX to an effective distance Xeff at the time the target vehicle leaves the detection space. This shortening stretch DX depends on the environment (motorway, trunk road, urban traffic), the speed of the target vehicle at the time it leaves the detection space, the instantaneous speed of the driver's vehicle, the curve radii of curves already traversed within a predetermined period of time in the past, or the like.

Since the target vehicle in front of the driver's vehicle "disappears" if it is travelling along a curve while the driver's vehicle is still travelling along a straight section, this would mean that the ACC system would increase the speed of the driver's vehicle. Consequently the speed when entering the curve would possibly be too high, so that the driver would have to brake sharply. The functionality according to the invention avoids this effect by generating a control signal that suppresses this increase in speed for a predetermined period of time. In this connection the control signal is characteristic of a maximum period of time—and is emitted for a correspondingly long time—which is obtained from the instantaneous speed of the driver's vehicle and the distance X between the driver's vehicle and the target vehicle at the time the latter leaves the detection space or the effective distance Xeff.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. System for the evaluation of the driving environment of a driver's vehicle and for influencing the speed of the driver's vehicle in its own lane, comprising:
    an electronic control unit (ECU) that is connected to
    a signal generator that generates a signal characteristic of a desired speed of the driver's vehicle,
    a signal generator that generates a signal characteristic of a turning rate of the driver's vehicle about its vertical axis, a signal generator that generates for objects located in the space in front of the driver's vehicle in a direction of travel of the driver's vehicle, a characteristic signal with respect to their distance and orientation relative to the driver's vehicle, which signal is at least one of a speed relative to a speed of the driver's vehicle, a distance relative to the driver's vehicle, and an angular displacement or a lateral deviation relative to a longitudinal axis of the driver's vehicle, and that is connected to a signal generator that generates a signal characteristic of a speed of at least one wheel of the driver's vehicle, and which is connected to at least one control device having an influence on a driving behaviour of the driver's vehicle, in order to feed output signals to the control device that are derived from a driving behaviour of a target vehicle located in front of the driver's vehicle, in which in order to define the mid line of the driver's vehicle's lane, in the space detected in front of the driver's vehicle the radius of curvature R of the path curve of the centre of gravity of the driver's vehicle is modified in the electronic control unit (ECU) on the basis of the change in bearing angle of objects travelling in front, and the absolute position of the objects travelling in front relative to an instantaneously predicted lane, characterised in that the extent to which changes in the radius of curvature are permissible also depends on the curve radius itself, wherein in the case of a very small curve radius a relatively high rate of change is permitted.

2. System according to claim 1, wherein the radius of curvature R of the path curve of the centre of gravity of the driver's vehicle is modified in the electronic control unit (ECU) by lateral speeds depending on objects moving in the space detected in front of the driver's vehicle.

3. System according to claim 1, wherein the radius of curvature R is modified in the electronic control unit (ECU) depending on a residence time of objects moving in the space detected in front of the driver's vehicle.

4. System according to claim 1, wherein the radius of curvature R is modified in the electronic control unit (ECU) depending on the speed of objects moving in the space detected in front of the driver's vehicle in the direction of travel of the driver's vehicle.

5. System according to claim 1, wherein the radius of curvature R is modified in the electronic control unit (ECU) depending on the distance of objects moving in the space detected in front of the driver's vehicle from the driver's vehicle.

* * * * *

UNITED STATES PATENT AND TRADEMARK OFFICE
CERTIFICATE OF CORRECTION

| | | |
|---|---|---|
| PATENT NO. | : 7,212,907 B2 | Page 1 of 1 |
| APPLICATION NO. | : 11/132790 | |
| DATED | : May 1, 2007 | |
| INVENTOR(S) | : Sascha Heinrichs-Bartscher | |

It is certified that error appears in the above-identified patent and that said Letters Patent is hereby corrected as shown below:

On The Title Page Item -63- after (65) Priority Publication Data, insert the following:

-- Related U.S. Application Data

(63) Continuation of application No. PCT/EP03/13036, filed on November 20, 2003.--

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,212,907 B2  Page 1 of 1
APPLICATION NO. : 11/132790
DATED : May 1, 2007
INVENTOR(S) : Sascha Heinrichs-Bartscher It is certified that error appears in the above-identified patent and that said Letters Patent is hereby corrected as shown below:

On the Title, after Item (63) Related U.S. Application Data, insert the following:

Item -- (30)      Foreign Application Priority Data

Nov. 21, 2002   (DE)   …………………………...102 54 403.4 --

Signed and Sealed this

Twenty-eighth Day of October, 2008

JON W. DUDAS
*Director of the United States Patent and Trademark Office*